US006295351B1

(12) United States Patent
Malik et al.

(10) Patent No.: US 6,295,351 B1
(45) Date of Patent: Sep. 25, 2001

(54) SYSTEM AND METHOD FOR INVOCATION OF A CHECK OF A TELECOMMUNICATIONS APPLICATION THROUGH USE OF A CALL PROBE

(75) Inventors: Dale W. Malik, Atlanta; Robert A. Koch, Norcross, both of GA (US)

(73) Assignee: BellSouth Intellectual Propety Corporation, Wilmington, DE (US)

( * ) Notice: Subject to any disclaimer, the term of this patent is extended or adjusted under 35 U.S.C. 154(b) by 0 days.

(21) Appl. No.: 09/065,810

(22) Filed: Apr. 23, 1998

(51) Int. Cl.[7] ................................................. H04M 7/00
(52) U.S. Cl. ............... 379/230; 379/207.02; 379/221.08
(58) Field of Search .............................. 379/201.01, 229, 379/230, 207.02, 220.01, 221.08, 1.01, 9, 15.02, 15.04

(56) References Cited

U.S. PATENT DOCUMENTS

| | | | |
|---|---|---|---|
| 5,430,719 | | 7/1995 | Weisser, Jr. .......................... 370/389 |
| 5,533,107 | * | 7/1996 | Irwin et al. ........................... 379/201 |
| 5,570,410 | * | 10/1996 | Hooshiari ............................... 379/32 |
| 5,581,610 | * | 12/1996 | Hooshiari .............................. 379/133 |
| 5,583,976 | * | 12/1996 | Bullard, Jr. .......................... 379/112 |
| 5,640,319 | * | 6/1997 | Beuning et al. ..................... 379/219 |
| 5,651,059 | * | 7/1997 | Morgan et al. ...................... 379/207 |
| 5,878,126 | * | 3/1999 | Velamuri et al. .................... 379/219 |
| 5,903,636 | * | 5/1999 | Malik .................................. 379/142 |
| 6,028,921 | * | 2/2000 | Malik et al. ......................... 379/201 |

* cited by examiner

*Primary Examiner*—Ahmad Matar
*Assistant Examiner*—Benny Q. Tieu
(74) *Attorney, Agent, or Firm*—Nora M. Tocups, Esq.; James L. Ewing, IV, Esq.; Kilpatrick Stockton LLP

(57) ABSTRACT

A method and system to invoke a check of a service package application (SPA) with respect to a communication as the communication is routed through the telecommunications system. To invoke the check, probe information received from a user is arranged and provided to a call probe assembler. This call probe assembler assembles the arranged probe information into a call probe including a called number that corresponds to an SPA. The call probe is associated with a communication which is routed through the telecommunications system based on the called number. In the course of this routing, a recognition is made that the called number corresponds to the SPA and a check is made of the SPA with respect to the communication. The check may result in the SPA performing certain operations based on the type of call probe. An external call probe may result in the SPA applying an advanced service with respect to the communication based on the information in the call probe. An internal call probe may result in the SPA obtaining, extracting, delivering and/or changing data that is associated with the SPA. After the check of the SPA, the communication may be further processed pursuant to instructions or information obtained during the check. Alternatively, the communication may be delivered to the called number.

21 Claims, 6 Drawing Sheets

SYSTEM AND METHOD FOR INVOCATION OF A CHECK OF A TELECOMMUNICATIONS APPLICATION THROUGH USE OF A CALL PROBE

FIELD OF THE INVENTION

This invention generally relates to the field of telecommunications and to the field of data communications. Particularly stated, this invention relates to obtaining, extracting, delivering and/or changing data in a service package application (SPA) in response to the use of a call probe in association with a communication that is processed through the telecommunications system, and preferably, through the Advanced Intelligent Network (AIN).

BACKGROUND OF THE INVENTION

Modern telecommunications systems are operated in connection with sophisticated computer networks and typically include Advanced Intelligent Network (AIN) architecture. These telecommunications systems provide numerous advanced services to the customer in a fast, efficient, and largely transparent manner. Data associated with the subscription, implementation and provision of an advanced service to a subscriber is typically stored in or associated with a service package application (SPA) that is stored or associated with a network element such as a service control point (SCP). An SPA also may be referred to as a telecommunications application or application. As noted, generally an advanced service and other telecommunication services are provided to a calling line through the operation of an SPA.

In the process of developing and supporting advanced services, the checking, testing and trouble-shooting of these advanced services is critical to ensure proper operation. Methods and systems for checking, testing, trouble-shooting or otherwise obtaining test information regarding an advanced service in a telecommunications system are disclosed in the commonly assigned patent application, Malik et al., "Method and system to obtain test information regarding an advanced service in a telecommunications system" and filed in the United States Patent and Trademark Office on Nov. 10, 1997, as Ser. No. 08/967,071. Malik et al. is incorporated herein by reference. A general description Malik et al. is provided below, and this general description is followed by a general discussion of the points not addressed by Malik et al.

General Description of Malik et al.

Generally stated, Malik et al. discloses a method and system applied in connection with a communication that is received in the telecommunications system and that is associated with identification information including a test indicator such as a test calling line number. Based on the identification information, the processing of the communication is paused while call processing instructions are obtained with respect to the application of an advanced service to the communication. In the course of obtaining the call processing instructions, the test indicator is recognized. For example, a service package application (SPA) may be predisposed to recognize the test indicator in the identification information.

In Malik et al., in response to the recognition of the test indicator, test information is obtained with respect to the advanced service to be applied to the communication. Alternatively, in response to the recognition of the test indicator, an exchange of information may be conducted with the calling party with respect to the determination of type or types of test information that may be obtained. For example, an announcement may be played to the communication announcing the plurality of types of test information, and a signal may be received from the communication with the signal indicating the type of test information that is to be obtained. The test information is associated with the communication. For example, the test information may be substituted for the test indicator in the identification information associated with the communication.

In Malik et al., after association of the test information with the communication, the processing of the communication then is resumed pursuant to the call processing instructions so that the advanced service is applied to the communication. In particular, the communication is routed with the test information through the telecommunications network. By this method and system, test information with respect to the advanced service applied to the communication is obtained based on the recognition of the test indicator associated with the communication. The test information may be displayed or otherwise obtained at the terminating unit or its connected devices where the communication is terminated.

Points Not Addressed By Malik et al.

Malik et al. discloses methods and systems for testing, trouble-shooting or otherwise obtaining test information regarding an advanced service in a telecommunications system. It would be useful to apply these methods and systems to more general circumstances. A limitation of Malik et al. is that the test information that generally may be obtained relates to the advanced service which is applied to the communication. It would be advantageous to be able to choose an advanced service or other application and to obtain, extract and/or deliver data relating to that choice without necessarily having the advanced service applied to the communication. It also would be advantageous to be able to choose an advanced service or other application and to change the data that is associated with that application in a convenient manner.

As also explained above, the subject matter of Malik et al. provides that test information is obtained in response to the recognition of the test indicator such as the test calling line number. Thus, a limitation of Malik et al. is that the communication is associated with a test indicator in order for test information to be obtained and processed in association with the communication. In some cases, it may be desirable to obtain data such as test information, but without the necessity of having a test indicator associated with the communication. For example, a test indicator may be a test calling line such that a communication that seeks test information is placed from the test calling line. The test calling line may be a special line and generally unavailable except to service personnel Therefore, it would be advantageous to a subscriber and others to be able to make a call to obtain data but without the call including a test indicator in association therewith. In other words, it would be advantageous for a service representative to be able to make a call from any telephone or other telecommunications unit and to conduct a check or test of a service package application (SPA).

As further explained above, the subject matter of Malik et al. provides for the transmittal of the test information in association with the communication so as to apply the advanced service to the communication and to route the communication with the test information through the telecommunications network. Thus, a limitation of Malik et al. is that the communication may be routed pursuant to the advanced service that is applied to the communication. Nonetheless, it is desirable to obtain information or data and to select a delivery option for that data other than the delivery that may occur as a result of the application of an advanced service to the communication or other routing of the communication. In other words, it is desirable to be able to choose the terminating connection of a communication so that data may be delivered to that chosen terminating connection.

In conclusion, Malik et al. discloses methods and systems for obtaining a certain type of data, i.e., test information associated with the application of an advanced service to a communication as it is processed in a telecommunications system. But Malik et al. has limitations such as being operative generally to obtain test information relating to the advanced service which is being applied to the communication, such as requiring a test indicator in order for the test information to be obtained, and such as the communication being limited to routing pursuant to the advanced service applied to the communication.

Therefore, there is a need for a method and system that obtains data and transmits the data in a call processing message associated with a call in a telecommunications system.

In particular, there is a need for a method and system that obtains data relating to a chosen advanced service or other application without having to have the advanced service applied to the communication that is used to obtain the data.

More particularly, there is a need for a method and system that allows a subscriber and others to be able to make a call to obtain data but without the call including a test indicator in association therewith.

Yet even more particularly, there is a need for a method and system that allows a user to choose the terminating connection of a communication so that data may be delivered to that chosen terminating connection.

SUMMARY OF THE INVENTION

Generally stated, the present invention solves the problems discussed above by including methods and systems to invoke a check of a service package application (SPA) with respect to a communication as the communication is routed through a telecommunications system. The present invention also includes an apparatus such as a call probe assembler for use in the assembly of a call probe that may be used to invoke a check of an SPA. Advantageously, the present invention provides for the testing of an SPA through the use of a call probe that invokes a check of the SPA. Through the use of a call probe, a caller may invoke the check or test of the SPA without having to make a call from a preselected calling line or otherwise providing that the call include a test indicator associated therewith. An exemplary embodiment of the present invention provides for the use of an external call probe so as to check the functionality of an SPA based on probe information that is included in the external call probe. Another exemplary embodiment provides for the use of an internal call probe so as to check the functionality of an SPA by, inter alia, obtaining, extracting and/or delivering data that is associated with the SPA. Yet another exemplary embodiment provides for the use of an internal call probe to change or eliminate data that may be associated with an SPA. Other advantages of the present invention will be apparent from the following summary and detailed description.

More particularly stated, exemplary embodiments of the present invention allow a caller such as a telecommunications service representative to place a call from any telecommunications device to initiate the process of invoking a check of an SPA. A service representative may desire to invoke a check of an SPA to analyze a subscriber's complaints of the application or lack thereof of an advanced service to the subscriber's calling line. The service representative preferably calls a probe access number and the call is directed to an intelligent peripheral in the telecommunications system. Upon receipt of the communication at the intelligent peripheral, the service representative provides information relating to the check and this information is arranged into probe information.

In an exemplary embodiment, after receipt and arrangement of the probe information, the intelligent peripheral makes a feature access code call. This feature access code call includes the probe information that is dialed or otherwise transmitted using digits of the feature access code followed by a free form string of up to thirty subsequent digits. This feature access code call hits a customized dialing plan trigger at a service switching point (SSP). The trigger results in a query being sent to a service control point (SCP) that includes a probe creation SPA. The query is a TCAP message, and in particular, an Info Analyzed Message that has two fields: (1) a field for the feature access code; and (2) a field for the probe information as part of the subsequent digits.

Upon receipt of the arranged probe information, the probe creation SPA of the SCP then assembles a "call probe" based on the probe information. Preferably, the probe creation SPA assembles the probe information into a call probe having three fields: (1) a called party field; (2) a calling party field; and (3) a redirecting number field. The called party field is populated with the directory number ("called number") which is associated through subscription or otherwise with an advanced service or application which is provided by an SPA. The calling party field may be populated with an indicator to flag whether the call probe is an internal probe or an external probe. The calling party field also may be populated with other information. The redirecting number field may be populated with conditions that may be used in the "check" of the SPA. The call probe in the form of the three fields is returned to the appropriate SSP in a response in a TCAP response message, in particular, an Analyze Route message.

Upon receipt of the call probe from the SCP, the SSP then routes the call through the telecommunications system to the SSP that serves the called number, i.e., the terminating SSP. As noted, this called number is associated with an advanced service or application, and as a result of this association, a TAT trigger is provisioned on the serving SSP of the called number. In response to the trigger, a query is sent to the appropriate SCP. The query is a TCAP message, in particular, a Termination Attempt message that has three fields which correspond to the three fields of the call probe.

The SCP, and in particular, the SPA makes a determination as to whether the call probe is an external call probe or an internal call probe. If external, the advanced service or application is applied in a conventional manner based on the probe information in the call probe. For example, the probe information may instruct the SPA to apply an advanced service as if the call originated from Miami or as if the call originated on a Saturday at 2:00 A.M. Advantageously, from the advanced service being applied based on the probe information, the service representative may obtain insight as to the functionality of the SPA given the imposed conditions provided by the call probe.

If the call probe is an internal call probe, then a further determination may be made as to whether the internal call probe is passive or intrusive. Generally, a passive internal call probe results in obtaining, extracting data from the SPA and/or delivering the data to a directory number as selected by the user and included in the call probe. Use of a passive internal call probe may be advantageous to obtain information on the functionality of the SPA, on the data relating to the SPA and to a particular customer, calling number or called number that is contained in the SPA, or on the SPA's ability to process calls and use the application and customer data appropriately. For example, a passive internal call probe may be used to check whether a subscriber's personal identification (PIN) data has been entered correctly into the data of the SPA.

Generally, an intrusive internal call probe results in changing data in an SPA. The types of data that may be changed by an intrusive internal call probe include: data relating to the SPA, to a particular customer, calling number or called number that is contained in the SPA, or to the SPA's ability to process calls and use the application and customer data appropriately, or similar data. For example, an intrusive internal call probe may be used to change a subscriber's PIN in the date of the SPA. Whether the internal call probe is passive or intrusive, the probe information may provide information as to the further processing of the communication associated with the call probe. For example, with a passive internal call probe, the SPA may obtain information and transmit it through further association of the call probe with the communication to a terminating device associated with the called number or with a directory number other than the called number. The terminating device may include a computer, and the information obtained from the SPA, may be displayed on a computer screen. Advantageously, from this display, the service representative may analyze the functionality of the SPA or the data or other information associated therewith.

Therefore, it is an object of the present invention to provide a method and system to invoke a check of a service package application (SPA) with respect to a communication as the communication is routed through a telecommunications system.

It is an additional object of the present invention to provide a method and system that allows a user to invoke the check of the SPA through a call into the telecommunications system without the call including a test indicator in association therewith or having to be made from a predesignated calling line.

It is a further object of the present invention to provide for a method and system that allows a user to invoke a check of the SPA that checks its functionality based on given conditions in the application of the advanced service to a calling line.

It is yet another object of the present invention to provide for a method and system that allows a user to invoke a check of the SPA that checks the data and other information associated with the SPA by invoking the SPA to obtain, extract and/or deliver the data.

It is also an object of the present invention to provide for a method and system that allows a user to invoke a check of the SPA that changes the data and other information associated with the SPA.

The features and advantages of the present invention may be more clearly understood and appreciated from a review of the following detailed description and by reference to the appended drawings and claims.

DETAILED DESCRIPTION

Figure 1:
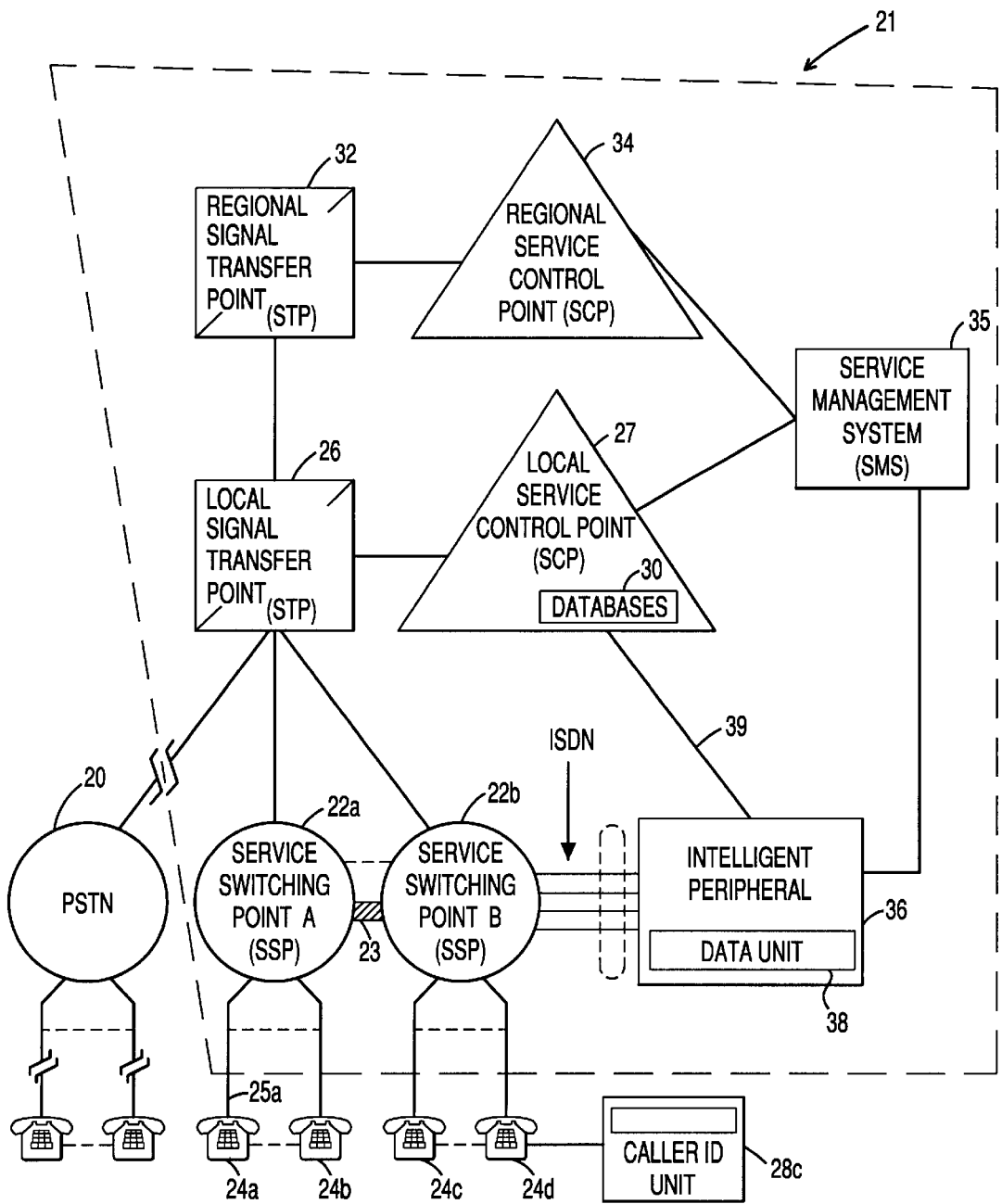
FIG. 1 is a diagram of an exemplary environment for operation of the exemplary methods and systems of the present invention.

The present invention includes methods and systems to invoke a check of a service package application (SPA) with respect to a communication as the communication is routed through a telecommunications system. The present invention also includes an apparatus such as a call probe assembler for use in the assembly of a call probe that may be used to invoke a check of an SPA. Advantageously, the present invention provides for the testing of an SPA through the use of a call probe that invokes a check of the SPA. The particular embodiments and examples described herein are intended in all respects to be illustrative rather than restrictive. Alternative embodiments will become apparent to those skilled in the art to which the present invention pertains without departing from its spirit and scope.

This detailed description first provides an overview of exemplary embodiments of the present invention including general explanations of the types of call probes that may be used. Then, with reference to FIG. 1, this detailed description provides an overview of an exemplary environment for implementation of the exemplary embodiments. The overview of the exemplary environment is followed by a description of the operation of an exemplary embodiment beginning with the assembly of a call probe and with reference to FIG. 2. Additional information then is provided with reference to FIG. 3 through a description of the operation of an exemplary method beginning with the receipt of information that may be assembled as probe information. Additional details of the operation of exemplary embodiments are provided in connection with FIGS. 4A and 4B. A description of an exemplary system and operational steps is provided in connection with FIG. 5. In addition, the reader is advised that throughout the drawings, like numerals indicate like elements.

Overview of the Operation of an Exemplary Embodiment

Generally stated, the present invention includes methods and systems to invoke a check of a service package application (SPA) with respect to a communication as the communication is routed through a telecommunications system. In an exemplary embodiment, a call probe is assembled and used with a communication to invoke the check of the SPA. Particularly, the call probe includes a called number that corresponds to an SPA that provides an advanced service(s) or other service to the calling line associated with the called number. Thus, the routing of the communication with the call probe through the telecommunications system results in a pause in the processing of the communication at the terminating switch, i.e., the switch that serves the called number. In other words, the called number triggers the terminating switch to initiate a query/response exchange with an appropriate SCP, and in particular, to conduct a check with an SPA(s) with respect to the communication.

The call probe further allows for information to be obtained, extracted and/or delivered so that a user may see what happens as a result of that query/response to the SPA. Based on this check, the advanced service or other service may be applied in a conventional manner (external call probe). Alternatively, additional information/instructions may be obtained, extracted and/or delivered (internal call probe). The additional information/instructions may be passed along in the communication to the called number, or the instructions may result in actions other than conventional actions taken with respect to the communication.

Examples of Uses of Exemplary Embodiments

A few examples of the uses of exemplary embodiments of the present invention are now provided to demonstrate advantages and provide further detailed description.

External Call Probe

As a first category, consider the use of what is denominated herein as an "external call probe" in connection with an exemplary embodiment of the present invention. Generally stated, an external call probe may include information to induce an SPA to function as it would function otherwise under normal circumstances with the SPA having been provided with that information. By providing information in the external call probe, the user generates circumstances to check or test how the SPA functions with the provided information.

An external call probe may be used in an exemplary embodiment to test a caller's line options with respect to an SPA(s). A caller's line option typically is a line option that is set by a service control point (SCP) with an SPA(s) (an "application SCP" or "APP SCP"). Use of an external call probe to test a caller's line options may be advantageous to conduct remote testing of an SPA which performs call processing decisions based on the geographic location of the caller or on the specific caller's telephone number, and in like situations. In addition, an external call probe may be used in an exemplary embodiment to test the general environment relating to use of an SPA(s) with respect to a call.

The first example demonstrates the use of an external call probe in testing a caller's line options with respect to an SPA. Assume a user is interested in checking the functionality of an SPA regarding a call that is placed from a first location such as Miami to a second location. Advantageously, the exemplary embodiment allows the user to make this test without the user having to place the call from Miami. The use of a call probe allows the user to make the call appear as if the call had been placed from Miami. When the SPA receives the call probe, the SPA processes the appropriate information from the call probe as if the call originated from Miami. Generally, an SPA uses application data and customer-specific data which is data pertinent to the specific application customer. In this example, the SPA processes the appropriate information as though the call originated from a caller in Miami who had selected a Preferred Interexchange Carrier (PIC) of XXXX. This PIC information typically is included in the call probe provided to the SPA. The results of this processing indicate the manner in which the SPA is functioning. For example, the results may indicate the location where a call placed as this call had been placed would be terminated or delivered. The call probe may be configured such that if the SPA is functioning correctly, the call would be terminated to the called number; or that if the SPA is functioning incorrectly, the call may be terminated to a directory number other than the called number. As another example, the results may indicate whether the SPA changes the value of the PIC in the course of processing the appropriate information from the call probe. Options other than PIC information that may be tested or checked through the use of an external call probe include billing options, a billing rate indicator, trunk group routing, a return of an indication on how to provide certain services such as a distinctive ringing cycle, and other similar options.

The second example demonstrates the use of an external call probe in testing the general environment relating to the use of an SPA. Assume a call probe is provided to an SPA so that the SPA processes the appropriate information from the call probe as if the call were placed on a Saturday at 2:00 A.M. Eastern Standard Time. Advantageously, the exemplary embodiment allows the user to make this test of the SPA without having to stay up until Saturday at 2:00 A.M. to do so. The use of the call probe allows the user to make the call appear as if the call had been placed at a time other than the actual time. When the SPA receives the call probe, the SPA processes the appropriate information from the call probe as if the call originated on Saturday at 2:00 A.M. As with the previous example, the results of this processing indicate the manner in which the SPA is functioning when provided with such information.

In addition to the examples provided above, an external call probe may include information such as a specification of SPA features to be invoked on a particular call, billing parameters, routing parameters, and other parameters which may be used to set or set by the SPA, or similar information. Advantageously, the results in the processing of a call associated with an external call probe having such information in the external call probe may provide the user with information as to the functionality of the SPA with respect to such information.

Internal Call Probe

As a second category, consider the use of what is denominated herein as an "internal call probe" in connection with an exemplary embodiment of the present invention. Generally stated, an internal call probe may include information to induce an SPA to obtain, extract, and/or deliver data in association with a communication. Also, an internal call probe may result in a change in information or data that is stored in an SPA. Typically, the data (whether obtained, extracted, delivered or changed) is pertinent to the SPA or to a subscriber, called number or calling number associated with the SPA. By including certain information in the internal call probe, the user generates circumstances such that the SPA functions to obtain, extract and/or deliver and/or change desired data.

Passive Internal Call Probe

As used herein, an internal call probe may be a "passive" internal call probe or an "intrusive" internal call probe. Generally, a passive internal call probe results in obtaining, extracting data from the SPA and/or delivering the data to a directory number as selected by the user and included in the call probe. Use of a passive internal call probe may be advantageous to obtain information on the functionality of the SPA, on the data relating to the SPA and to a particular customer, calling number or called number that is contained in the SPA, or on the SPA's ability to process calls and use the application and customer data appropriately. Typically, the data called for by the passive internal call probe is delivered to the user at a designated dialed calling line number.

For example, a passive internal call probe may be used to determine whether a customer's data has been provisioned correctly in the SPA. A passive internal call probe may be used to check out any of the following complaints that may be made by a customer: (1) calls during a certain time of day are being routed to an incorrect number; (2) a specific feature of a customer's advanced service does not work or works incorrectly; (3) call events are billed to an incorrect number; (4) a personal identification number (PIN) does not work; or (5) an advanced service does not work at all with respect to a customer's calling line. To obtain the data related to these complaints, a passive internal call probe is provided with the appropriate information to induce the SPA to obtain, extract and/or deliver the data. Of course, to respond to such a passive internal call probe, an SPA may be pre-disposed to recognize the appropriate information, data or an indicator in the probe and to respond to the presence of such information, data or an indicator by obtaining, extracting and/or delivering the data to a preselected calling line number. In particular, an SPA may be predisposed to invoke the normal application logic, obtain, extract and/or deliver the appropriate data based on the presence of certain information, data or an indicator in the passive internal call probe.

To aid a user in quickly addressing a customer's complaint, the user may review a table of predefined passive internal call probes that may be launched to obtain, extract and/or deliver data relating to the customer's complaint. The term "predefined" passive internal call probe is used herein to refer to a call probe that has been configured so as to induce an SPA to obtain, extract, and/or deliver preselected data. An example of such a table is illustrated below:

| No. of Predefined Passive Internal Call Probe | Type of Preselected Data that Is Obtained, Extracted and/or Delivered |
|---|---|
| 1 | Customer-specific time-of-day routing numbers |
| 2 | Customer-specific flags which indicate which features a customer has chosen |
| 3 | Customer-specific billing number data |
| 4 | Customer-specific PIN data |
| 5 | Customer-specific trigger type |

Other possibilities for predefined passive internal call probes will occur to those skilled in the art. In addition, the use of predefined call probes and tables thereof is equally applicable to all types of call probes and is not limited to passive internal call probes.

Intrusive Internal Call Probe

Generally, an intrusive internal call probe results in changing data in an SPA. The types of data that may be changed by an intrusive internal call probe include: data relating to the SPA, to a particular customer, calling number or called number that is contained in the SPA, or to the SPA's ability to process calls and use the application and customer data appropriately, or similar data. Of course, to effect the change in the data, the SPA usually is predisposed to recognize the information in the intrusive internal call probe as instructions to make the change or as an indicator to obtain instructions to make the change.

Advantageously, the passive and intrusive internal call probes may be used in combination to check out a customer's complaint and to make the necessary corrections. For example, a customer may complain that his or her personal identification (PIN) data is incorrect. To check out this complaint, a passive internal call probe may be used to obtain, extract and deliver the PIN data to the service representative. If the data indicates that the customer's PIN data is incorrect, then the service representative may launch an intrusive internal call probe to effect changes to the PIN data. To verify that the changes to the PIN data were put into effect, another passive internal call probe may be used to obtain, extract and deliver the new PIN data to the service representative.

Overview of an Exemplary Environment—FIG. 1

FIG. 1 is a diagram of an exemplary environment for operation of the methods and systems of the present invention. Connected to the public switched telecommunication network (PSTN) 20 as an exemplary environment is an Advanced Intelligent Network (AIN) 21. For brevity, only a basic explanation of the AIN 21 is provided herein. Where the AIN 21 operates or is composed differently in an important aspect from that which would be understood by those skilled in the art, additional details are provided herein. For further information regarding the referenced AIN 21 and aspects thereof, the interested reader is referred to the commonly-assigned patent to Weisser, U.S. Pat. No. 5,430,719, which is incorporated herein by reference.

The AIN 21 includes a variety of interconnected network elements. A group of such network elements includes the plurality of central offices which are indicated as service switching points (SSPs) 22a, 22b in FIG. 1. An SSP may be referred to herein as a switch. An SSP typically includes switch functionality, but also includes other functionality so as to communicate with other AIN elements as those skilled in the art will understand. As further illustrated in FIG. 1, the SSPs 22a, 22b have a plurality of subscriber lines connected thereto. A subscriber line may also be referred to as a calling line. Each SSP serves a designated group of calling lines, and thus, the SSP that serves a particular calling line may be referred to as its serving SSP. Each calling line is connected typically to a piece of terminating equipment including a plurality of telephones commonly referenced as 24 and individually referenced as 24a, 24b, 24c and 24d. Although telephones are illustrated as the pieces of terminating equipment in FIG. 1, those skilled in the art will understand that such pieces include other devices such as facsimile machines, computers, modems, answering machines, etc. In addition, a caller identification (ID) unit 28c is illustrated as connected telephone 24d. Alternatively, the terminating equipment may have data receipt capability such as an analog display service interface (ADSI) compatible telephone, or a computer functionally connected to the telephone.

Pursuant to the preferred embodiment, each active calling line in an AIN is assigned a ten digit calling line number. A calling line number is commonly referred to as a telephone number or a directory number. In the description of the present invention, the term "calling line number" is used in its generally understood meaning to be the number which is associated with the calling line on which the call originates. The term "calling line number" is used synonymously, unless indicated, with the following terms: calling party address, calling number or calling party number. Sometimes the term "calling line number" is abbreviated as "calling line". The term "dialed calling line number" is used in its generally understood meaning to be the number which is dialed or input by a caller or source to reach a piece of terminating equipment on a calling line associated with the dialed calling line number. The term "dialed calling line number" is used synonymously, unless indicated, with the following terms: called line number, called party address, called number or called party number.

Referring again to FIG. 1, SSPs 22a, 22b are interconnected by a plurality of trunk circuits 23. These are the voice path trunks that interconnect the SSPs to connect communications. The terms "communication" or "call" are used synonymously herein to include all messages that may be exchanged between caller and called party in the network illustrated in FIG. 1.

Each of the SSPs 22a, 22b is connected to another type of AIN element referred to as a local signal transfer point (STP) 26 via respective data links. Currently, these are data links employing a signaling protocol referred to as Signaling System 7 (SS7), which is well known to those skilled in the art. Much of the intelligence of the AIN resides in yet another type of AIN element referred to as a local service control point (SCP) 27 that is connected to STP 26 over an SS7 data link. Among the functions performed by the SCP 27 is the maintenance of network databases and subscriber databases as represented collectively by databases 30. These databases may be used in providing advanced services to a customer. Typically, the SCP 27 is also the repository of service package applications (SPAs) that are used in connection with or as part of the databases 30 in the application of advanced services, other services or enhanced features to calling lines. As used herein, the phrase "advanced services" refers to features or enhancements that are provided by a telecommunications service provider to a customer in addition to conventional telephone service through the PSTN.

Referring again to FIG. 1, the local STP 26 may be connected to other network elements through a regional STP 32, which in turn, may be connected to a regional SCP 34. Both regional SCP 34 and local SCP 27 are connected via respective data links to a service management system (SMS) 35. The SMS 35 interfaces to business offices of the local exchange carrier and interexchange carriers.

In order to keep the processing of data and calls as simple as possible, a relatively small set of triggers is defined at the SSPs. A trigger in the AIN is an event associated with a particular calling line that generates a query to be sent to an SCP. The trigger causes the SCP to make an inquiry of its databases or service package applications (SPAs) for processing instructions with respect to the particular call. The results are sent back to the SSP in a response from the SCP 27 through STP 26. The response includes instructions to the SSP as to how to process the call. The instructions may be to take some special action as a result of an advanced service or enhanced feature. In response, the SSP moves through its call states, collects the called digits, and generates further packets that are used to set up and route the call. Similar devices for routing calls among various local exchange carriers are provided by regional STP 32 and regional SCP 34.

As illustrated in FIG. 1, the AIN 21 also includes an intelligent peripheral (IP) such as a service circuit node 36 (SCN) or a service node (SN). IP 36 typically includes voice and dual tone multi-frequency (DTMF) signal recognition devices and voice synthesis devices. IP 36 is connected to the local SCP 27 via data link 39 using an X.25 protocol and to the SMS 35 via a data link. In addition, IP 36 typically is connected to one or more (but usually only a few) SSPs via Integrated Service Digital Network (ISDN) links as shown by the connection to SSP 22b.

In the preferred embodiment, IP 36 also includes a data unit 38 that may function as an interface in the implementation of exemplary embodiments of the present invention as is described in greater detail in connection with the figures below.

Figure 2:
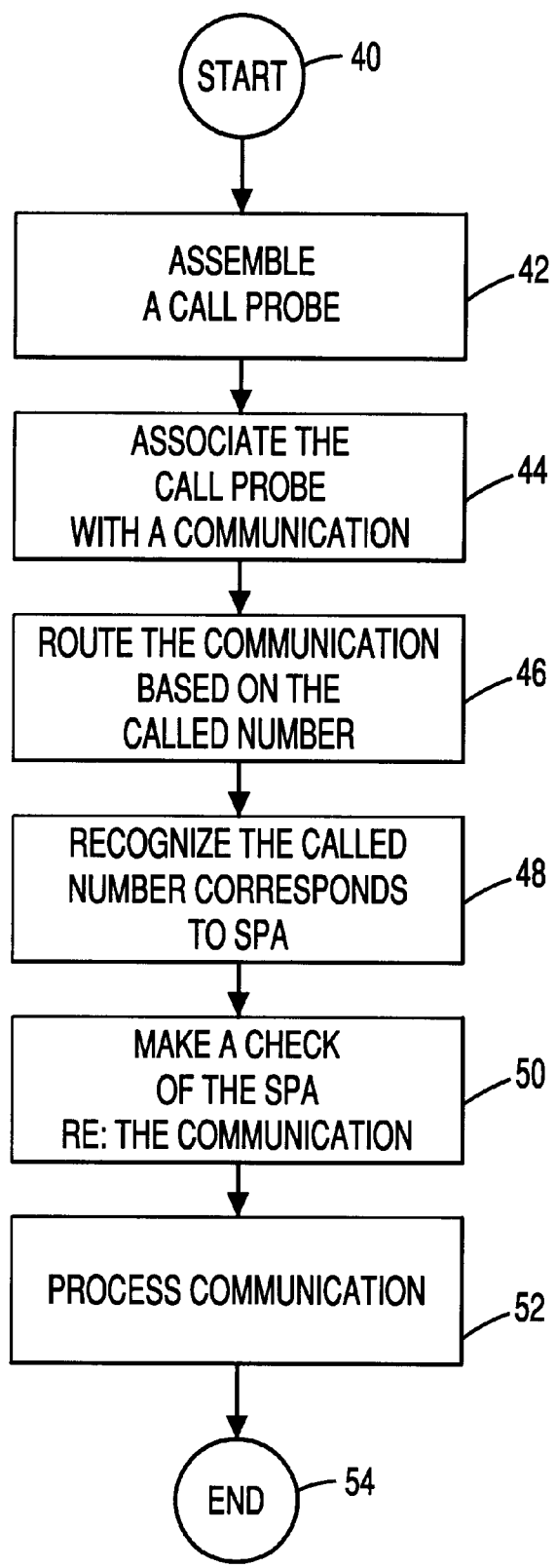
FIG. 2 is a flow chart illustrating an overview of the operation of an exemplary method of the present invention.

Overview of the Operation of an Exemplary Method—FIG. 2

FIG. 2 is a flow chart illustrating an overview of the operation of an exemplary method of the present invention. Generally stated, the exemplary method serves to invoke a check of a service package application (SPA) with respect to a communication as the communication is being routed to a destination. Per this exemplary method, after start step 40, to invoke this check, a call probe is assembled in step 42. Minimally, the call probe includes a called number that corresponds to a service package application (SPA) or to which an application provided by the SPA is to be applied. In other words, the call probe includes a called number to which an advanced service is applied through the use of an SPA. Advantageously, the call probe may be used to invoke a check of the functionality of the SPA as it applies (or fails to apply) the advanced service to calls that are directed to the called number. The call probe also may include an indicator or other flag to indicate whether the call probe is an internal probe or an external probe. In addition, the indicator or other flag may correspond to information so that the presence of the indicator or flag in the call probe alerts the SPA that certain information be obtained, extracted, and/or delivered in association with the processing of the communication.

The call probe may include other data such as information, conditions, parameters or flags that may relate to the "check" of the SPA, i.e., different service scenarios to be tested. Advantageously, in the exemplary embodiment, probe information may be assembled to create the call probe through the use of the fields of an AIN message such as a TCAP message, and in particular, an Analyze Route message. For example, in assembling the call probe by using the Analyze Route message, the called number of the call probe may be included in the called number field of the Analyze Route message. In addition, the calling party number field of the Analyze Route message may include the indicator that flags whether the call probe is an internal probe or an external probe. Alternatively, the redirecting party number field of the Analyze Route message may include the indicator. The other data of the call probe such as the information, conditions, parameters or flags that may relate to the "check" of the SPA may be included, as previously provisioned and set up, in either the calling party field or the redirecting party field of the Analyze Route message.

Referring again to FIG. 2, in step 44, the call probe is associated with a communication. Preferably, this association is effected through inclusion of the probe information from the three fields of the Analyze Route message in the identification information that is associated with a communication, and in particular with the appropriate integrated services digital network user part (ISUP) message, as the communication is routed through the telecommunications system. The communication then in step 46 is routed with the call probe through the telecommunications system based on the called number. In step 48, a recognition is made that the called number corresponds to an SPA. Preferably, this recognition is based on an AIN trigger that has been provisioned in the SSP that serves the called number. In response to the recognition, in step 50, a check is made of the SPA with respect to the communication. Advantageously, the check may include use of an external or internal call probe with respect to the SPA. After making the check, in step 52, the communication is processed. For example, the communication may be processed by terminating the communication to the called number. Alternatively, the processing of the communication may include terminating the communication to a directory number other than the called number. This re-routing of the communication may be effected through the check of the SPA and use of a call probe in the check. The exemplary method ends in step 54.

Figure 3:
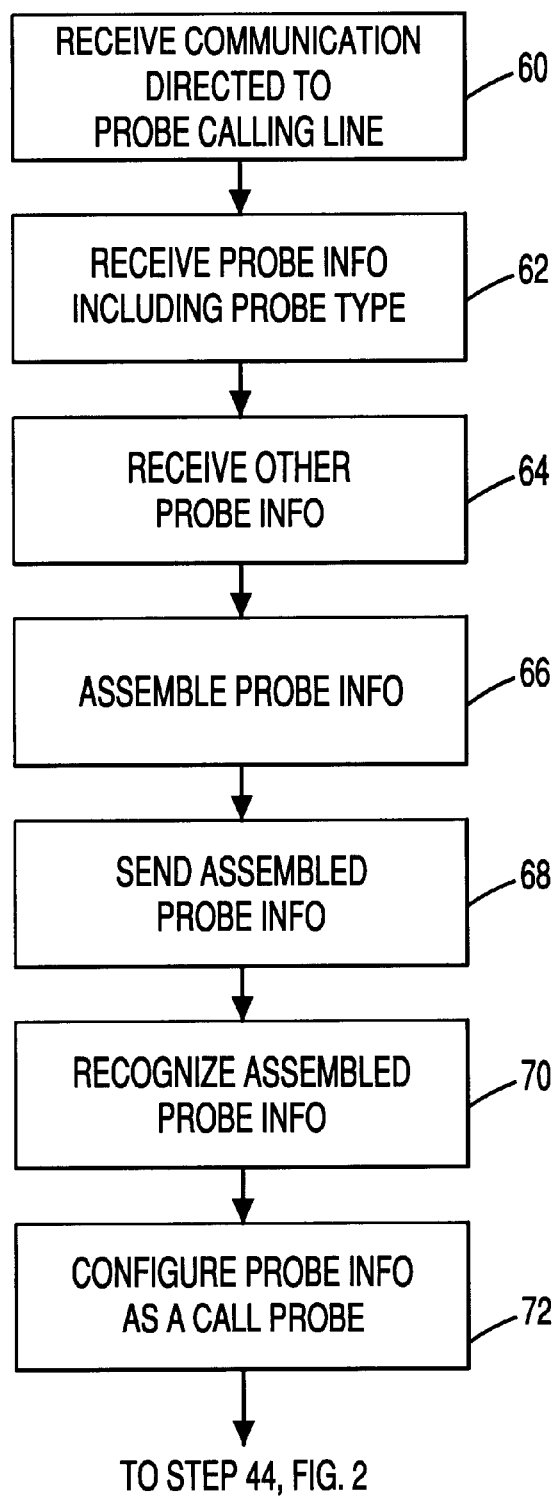
FIG. 3 is a flow chart illustrating steps relating to the operation of another exemplary method.

Receipt and Arrangement of Probe Information—FIG. 3

FIG. 3 is a flow chart illustrating steps relating to the operation of another exemplary embodiment. The present invention includes another exemplary method to invoke a check of a service package application (SPA) with respect to a communication as the communication is being routed to a destination. Per this exemplary method, certain steps take place prior to the assembly of the call probe as explained above in connection with step 42, FIG. 2. Generally, these earlier steps provide for receipt and assembly of probe information from which the call probe of step 42 may be assembled. Referring to step 60 of FIG. 3, probe information may received through receipt of a communication that is directed to a probe calling line. As is explained in greater detail below in connection with FIG. 5, the probe information may be received as a result of a call to a probe access number. The caller provides information that is referred to herein as "probe information" that serves as the basis for the later assembly of the call probe, and thereby, for the invocation of a check of an SPA. For example, the caller may be a service representative who is conducting a check of the data in an SPA to analyze a subscriber's complaint.

As referenced in step 62 of FIG. 3, receipt of the probe information may include receipt of a probe type such as an internal probe or an external probe. As referenced in step 62, receipt of the probe information also may include receipt of information such as the following: (A) an identification of a directory number associated with the destination to which the communication is to be delivered, i.e., a called number; (B) an identification of a service package application (SPA) or service feature; and/or (C) an identification of check information that is sought including transparent data such as network data, application data or customer data that may be generated or stored in association with the application of a service to a communication as it is processed through the telecommunications system.

Still referring to FIG. 3, after the probe information has been received, in step 66 the probe information is arranged or assembled. After arrangement of the probe information, it is transmitted to a call probe assembler. For example, a call probe assembler may be a probe creation SPA in an SCP. Preferably, as noted in step 68, the arranged probe information is sent into the telecommunications system by placing a feature access code call that includes the arranged probe information. In step 70, the arranged probe information is recognized via a customized dialing plan trigger, and in step 72 the arranged probe information is configured as a call probe. In particular, the call probe assembler assembles a call probe based on the arranged probe information. As noted above in connection with the assembly of the call probe in the exemplary method described in connection with step 42 of FIG. 2, the call probe includes a called number that corresponds to a service package application (SPA). In this exemplary embodiment, after the arranged probe information has been used as the basis of the assembly of the call probe, this exemplary method continues with the steps of the above-described exemplary method beginning with step 44 of FIG. 2.

Figure 4A:
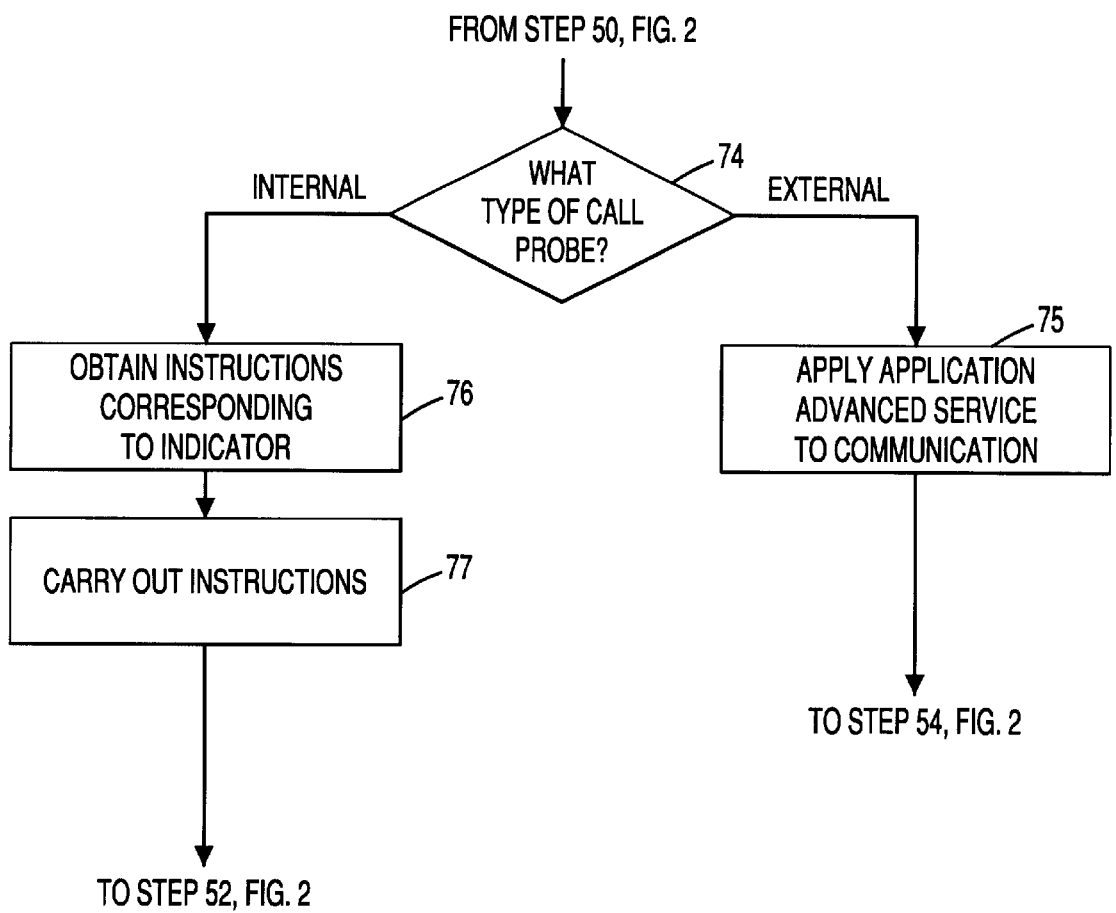
FIG. 4A is a flow chart illustrating additional steps with respect to operation of the exemplary method illustrated in FIG. 2.

Determination of Type of Call Probe—FIG. 4A

As noted, the exemplary methods described above in connection with FIGS. 2 and 3 provide for the invocation of a check of a service package application (SPA) with respect to a communication as the communication is being routed to a destination. Advantageously, the present invention includes features whereby the call probe or other information or data may be delivered to the called number in association with the connection of the communication. As another advantage, the present invention includes features whereby the use of the call probe may lead to actions other than conventional application of the advanced service by the SPA to the communication. Some of these advantageous features are presented below in connection with FIGS. 4A and 4B.

As noted in step 50 of FIG. 2, a check is made of the SPA with respect to the communication. In this check, a determination may be made with respect to whether the call probe or other information is be delivered to the destination in association with the communication or whether other actions are to be taken. In other words, the determination may be of the type of call probe that is being presented to the SPA.

In particular, after check step 50, as illustrated by step 74 of FIG. 4A, a determination may be made as to the type of call probe. The determination may be that the call probe is an external call probe. This determination may be based on the presence or lack of an indicator, flag or other data corresponding to information being associated with the call probe. In that case, per step 75, the application associated with the SPA is applied in a conventional manner to the communication. This conventional manner of application may include acting on other information or data that may be present in the external call probe. After step 75, the method then ends in step 54, FIG. 2. Advantageously, as discussed above in connection with the overview of exemplary embodiments of the present invention, an external call probe may be used to check the functionality of the SPA with respect to the information or data provided by the call probe.

Alternatively, in step 74 of FIG. 4A, a determination may be made that the call probe is an internal call probe. For example, the call probe may be an internal call probe based on the call probe including an indicator. As another example, this indicator or another indicator may further specify whether the internal call probe is a passive internal call probe or an intrusive internal call probe. Per step 76, the instructions corresponding to the indicator are obtained. For example, based on the indicator corresponding to a passive internal call probe, the SPA may obtain the corresponding appropriate instructions regarding how to operate when a passive internal call probe is received. Per step 77, the instructions are carried out. For example, if a passive internal call probe is received, the SPA may obtain and carry out instructions that result in obtaining, extracting and/or delivering data. The method then returns to step 52 in processing the communication based on the instructions. After step 52, the method then ends in step 54, FIG. 2.

Figure 4B:
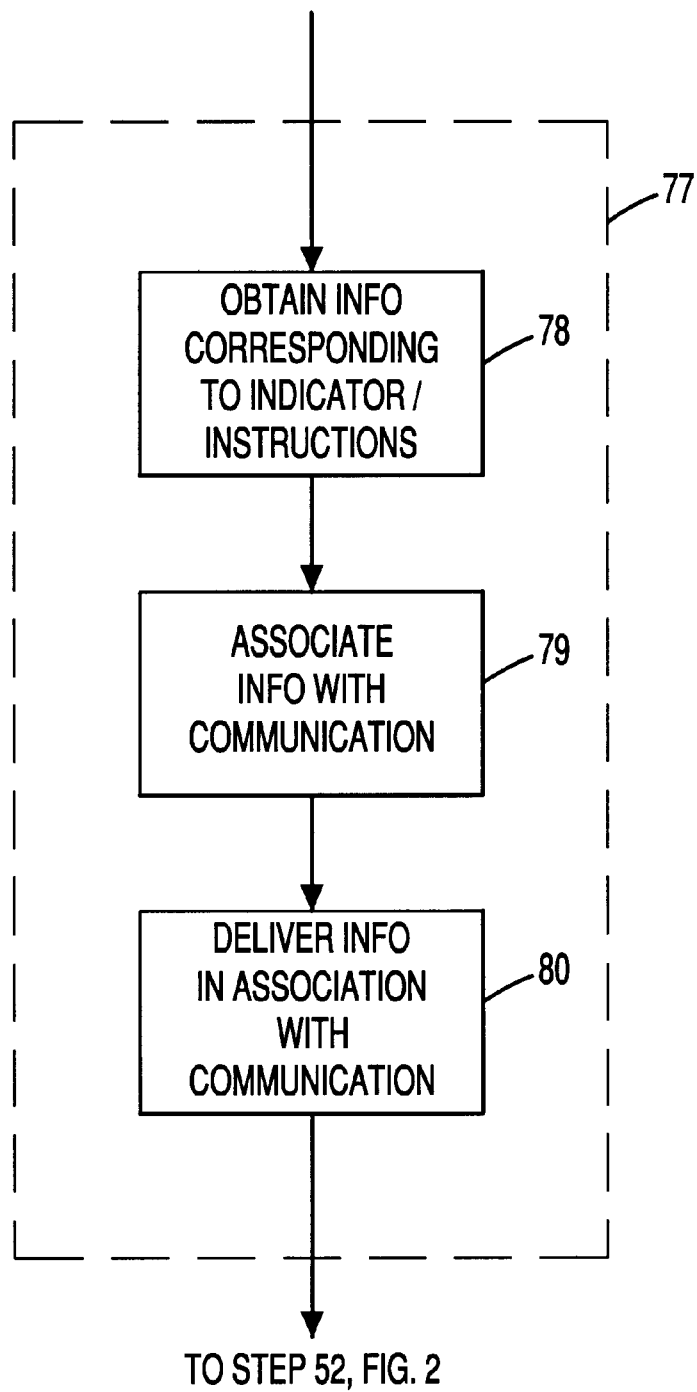
FIG. 4B is a flow chart illustrating additional steps with respect to the operation of the exemplary method illustrated in FIG. 4A.

Details of Carrying Out Instructions—FIG. 4B

FIG. 4B illustrates that more particular steps may be taken with respect to the step of carrying out the instructions corresponding to the indicator (step 77). For example, if the call probe is a passive internal call probe, then in step 78 information or data corresponding to the indicator or instructions may be obtained. In step 79, this information may be associated with the communication. In step 80, this information that is associated with the communication may be delivered such as through routing of the communication noted in step 52, FIG. 2. As another example, if the call probe is an intrusive internal call probe, then information or data corresponding to the indicator or instructions may be obtained and may be changed. Confirmation of the change may be provided with or otherwise associated with the communication and may be delivered such as through routing of the communication noted in step 52, FIG. 2.

Figure 5:
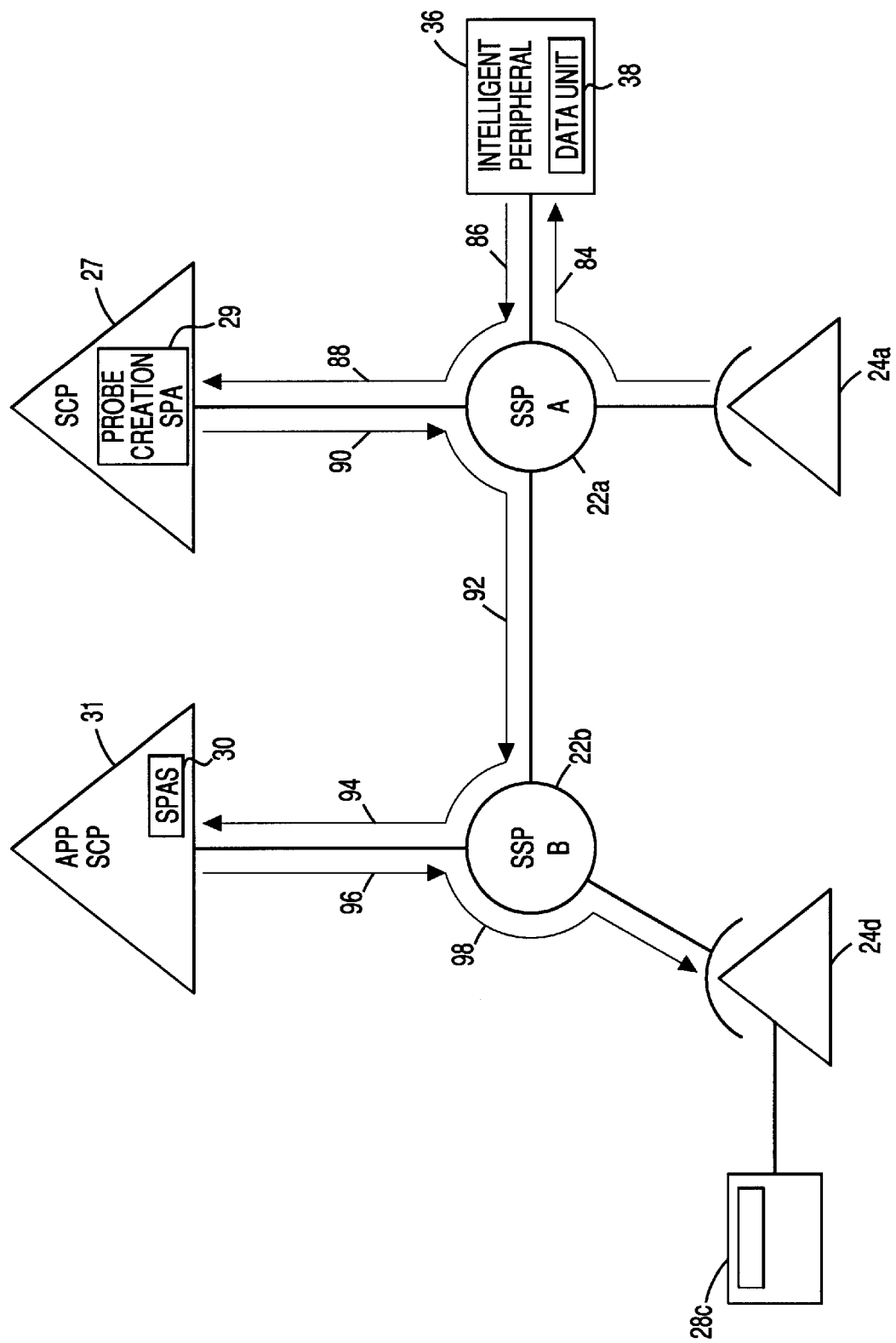
FIG. 5 is a diagram of an exemplary system and environment for operation of the exemplary methods and systems of the present invention.

Diagram of an Exemplary System and Operation—FIG. 5

The present invention includes an exemplary system and method that may be used in connection with the exemplary Advanced Intelligent Network (AIN) environment discussed above in connection with FIG. 1. As with the other exemplary methods, this exemplary method provides a process to invoke a check of a service package application (SPA) with respect to a communication as the communication is being routed to a destination. For example, as illustrated by arrow 84, a caller 24a may take steps to invoke a check of an SPA by placing a call to a probe access number, i.e., a directory number that connects the caller to an interface or data unit 38 used to collect probe information. A probe access number also may be referred to as a probe calling line number. Preferably, the probe access number is a directory number associated with an intelligent peripheral 36 such as a service node that is used in connection with the exemplary method. As illustrated by arrow 84, the call is routed from caller 24a through the telecommunications system through service switching point A (SSP A) 22a in a conventional manner to intelligent peripheral 36.

The intelligent peripheral 36 is predisposed to recognize the call to the probe access number as an attempt to invoke a check of a service package application (SPA). This predisposition may take the form of programming the intelligent peripheral to make this recognition and to respond as is explained below. In response to this recognition, the intelligent peripheral 36 may carry out an exchange of information with the caller 24a in order to determine and/or to receive probe information. Probe information generally may be thought of as the information or data that is provided by a caller or data that is relevant to such provided information or data so that a call probe may be later assembled so as to invoke a check of an SPA. Probe information is further defined above in connection with steps 60, 62 and 64 of FIG. 2.

Still referring to FIG. 5, the intelligent peripheral 36 may use the interface 38 or data unit to interact with the caller or to provide the caller with information such as service options, a list of available call probes, etc. The interface 38 may provide an audio interaction, dual tone multi-frequency (DTMF) interaction, a data interaction, a video interaction or other interaction with the caller. The interface 38 may make announcements, inquiries and take responses in a menu-type or other format. The interface 38 also may be used to collect and compile the probe information or changes thereto that are collected from the caller. The probe information or changes thereto that are collected may vary depending on the call probe that is desired to be routed by the caller. For example, the probe information collected for an external call probe may differ from the probe information collected for an internal call probe based on the different nature of these probes.

Upon receipt of the probe information from the caller 24a and based on the probe information, the intelligent peripheral 36 arranges/collects the probe information. Preferably, this probe information includes the directory number to which an advanced service or application is applied by the service package application (SPA) that is to be checked. This directory number is referred to herein as the called number.

As indicated by arrow 86 of FIG. 5, after the probe information is assembled, the intelligent peripheral 36 sends the probe information into the telecommunications system. Preferably, the intelligent peripheral 36 places a feature access code call that includes the probe information. The feature access code call is a call that is recognized via a customized dialing plan (CDP) trigger by a service switching point (SSP) or other network element as a call that requires instructions from another source such as a network element like a service control point (SCP). The instructions pertain to further processing of the feature access code call. For example, a feature access code call may be a call that is dialed or otherwise transmitted using digits such as *61 followed by a free form string of up to thirty subsequent digits. Per this exemplary method, after the intelligent peripheral 36 transmits the feature access code for the feature access code call, the intelligent peripheral 36 associates the probe information with the feature access code call by dialing up to thirty digits that represent the probe information. For example, the intelligent peripheral may transmit a feature access code call including the probe information by the following string of out pulse digits: *61XXXXXXXXXXXXXXXXXXXXXXXXXXXXXX.

Typically, these subsequent digits of the probe information may represent: (1) the ten digits of a called number such as the directory number to which an advanced service or application to be applied by the SPA selected by the caller 24a to be checked; (2) an indicator as to whether the call probe is an external call probe or an internal call probe (and whether the internal probe is a passive internal call probe or an intrusive internal call probe); and/or (3) data such as information, conditions, parameters, indicators or flags that may relate to the "check" of the SPA. As is explained below, the reaction of the SPA which is invoked for a check may differ depending on the probe type and the indicator, information, flag or data that is sent along and relates to the "check".

As indicated by arrow 86, FIG. 5, the feature access code call is transmitted into the telecommunications system and is routed in a conventional manner to service switching point A (SSP A) 22a. Based on the feature access code, SSP A 22a pauses in the processing of the feature access code call to obtain instructions with respect to further processing of the feature access code call. Preferably, the SSP A 22a obtains the instructions through a query/response exchange with service control point (SCP) 27. As indicated by arrow 88, SSP A 22a launches a query to SCP 27. The query includes the feature access code and the probe information. In particular, the query includes the up to thirty digits of the probe information.

Upon receipt of the query from SSP A 22a, the SCP 27 is predisposed to recognize the feature access code as an indication that a caller or other entity is attempting to invoke a check of a service package application (SPA). For clarity, this SCP 27 may be referred to as a probe assembler SCP 27 to distinguish this SCP 27 from a later SCP 31 that is referenced in the description of this exemplary method. This predisposition of the probe assembler SCP 27 may take the form of programming the SCP 27 or appropriate element thereof to make this recognition. Based on this recognition, the SCP 27 is predisposed to provide the probe information to a call probe assembler, and in particular, to a probe creation SPA 29. Preferably, the probe creation SPA 29 configures or assembles the probe information into a call probe. Configuration of the probe information as a call probe preferably includes assembly of the probe information into a response to the query from the SSP A 22a. In particular, the called number is included in the called number field of the response and other probe information may be included in the calling party field and/or the redirecting party field. Even though the probe information is assembled into the response, the assembly of this probe information is referred to herein as the call probe.

As indicated by arrow 90 in FIG. 5, the response is transmitted to the SSP A 22a from which the query was received. This response includes instructions for further processing of the feature access code call based on the called number field. Upon receipt of the response from the SCP 27, the call probe is associated with the communication by including the call probe in identification information that is conventionally transmitted in association with a communication. For example, the call probe may include probe information such as the called number and other information. In this example, the called number may be included in the called number field and the other information may be included in the redirecting number field and/or calling party field of the identification information. Even though the probe information of the call probe is assembled into the identification information, the assembly of this probe information is referred to herein as the call probe.

As indicated by arrow 92 of FIG. 5, the communication then is routed with the call probe based on the called number through the telecommunications system. In the example illustrated in FIG. 5, the communication is routed with the identification information including the call probe from SSP A 22a to SSP B 22b. Based on the direction of the communication to the called number, SSP B 22b is predisposed to recognize that instructions with respect to further processing of the communication are to be obtained. For example, this predisposition may include the setting of an AIN trigger with respect to the called number. Preferably, in response to the recognition, the SSP B 22b obtains the instructions through a query/response exchange with an SCP 31. For clarity, this SCP 31 may be referred to as an application service control point (APP SCP) to distinguish this SCP 31 from the earlier SCP 27 that has been referenced.

Advantageously, the reaction of the SSP B 22b to receipt of the communication to the called number and the query/response exchange that takes place thereafter is part of the "check" that is sought to be invoked by this exemplary method of the present invention. Thus, as illustrated by arrow 94, SSP B 22b launches a query to APP SCP 31 for instructions with respect to further processing of the communication. The query includes the call probe by including the identification information associated with the communication with the query. In particular, the query includes the probe information by inclusion of: (1) the called number in the called number field of the query; (2) the other information in the other fields, to-wit: the redirecting number field of the query; and/or the calling number field.

Upon receipt of the query from SSP B 22b, the APP SCP 31 is predisposed to recognize that the called number is associated with a service package application (SPA) 30 that is located in or otherwise associated with APP SCP 31, or the databases of APP SCP 31. The APP SCP 31 then directs the query to the appropriate SPA. Preferably, the SPA is predisposed to recognize the call probe, and in particular, the probe information in the identification information of the query. Specifically, the SPA is predisposed to make a determination that the call probe is an external probe. For example, this determination may be based on the information in the calling number field in the call probe having a digit other than a "0" as the first digit of the calling number. In the exemplary embodiment, the SPA is predisposed with respect to an external probe to apply the appropriate advanced service or application in a conventional manner based on the probe information in the call probe.

Alternatively, the SPA may make a determination based on an indicator in the call probe that the call probe is an internal call probe. For example, this determination may be based on the calling number field in the call probe having a digit such as "1" as the first digit of the calling number, or some other distinguishing feature that serves as an indicator of information. As another example, the SPA may make a determination based on the indicator or on another indicator in the call probe that the call probe is a passive internal call probe or an intrusive internal call probe. For example, the SPA may be predisposed to recognize that a calling number with a "1" as the first digit of the calling number is an indicator for a passive internal call probe that seeks test information. Obtaining test information at an SPA based on an indicator in a query is disclosed in the commonly assigned patent application entitled "Method and System to Obtain Test Information Regarding an Advanced Service in a Telecommunications System", Ser. No. 08/967071, filed on Nov. 10, 1997, which is incorporated herein by reference. Based on the indicator, the SPA obtains the test information.

As illustrated by arrow 96 of FIG. 5, whether the call probe or other information is to be delivered in association with the communication, or whether other steps are to be taken with respect to the call probe or to the communication, the SPA through the APP SCP 31 provides instructions to the SSP B 22b in the form of a response to the query which the SPA received from SSP B 22b. The response may include the call probe, the information in the identification information associated with the communication, or other data. The response may instruct the SSP B 22b to connect the communication to the called number and to provide the call probe or the information (as generated or found by the application) in association with the communication with that connection. Alternatively, the response may instruct the SSP B 22b to take other actions based on the information or instructions obtained from the SPA with respect to the call probe.

As illustrated by arrow 98 of FIG. 5, in reaction to the response from the APP SCP 31, the SSP B 22b may connect the communication to the called number such as the directory number associated with the terminating unit (telephone 24d). In particular, SSP B 22b provides the call probe or the information (as generated or found by the application) in association with the communication by providing the call probe or the information in the identification information associated with the communication. In particular, the identification information includes the call probe by inclusion of: (1) the called number in the called number field of the identification information; (2) the redirecting number in the redirecting number field of the identification information; and/or (3) optionally, the calling number in the calling number field of the identification information. Alternatively, the identification information includes the information by including the information in the calling number field of the identification information.

As illustrated in FIG. 5, telephone 24d includes a display device in the form of a caller ID unit 28c. Upon receipt of the communication and the identification information at the telephone 24d, the probe information from the call probe or other information (as generated or found by the application) may be displayed on the caller ID unit 28c associated with the telephone 24c. In particular, the probe information or other information may be displayed in substitution for the calling line identification that otherwise would be displayed on the unit. Alternatively, the destination or terminating unit may include a display device such as a computer with a display screen (not illustrated). Upon receipt of the communication and the identification information including the call probe or other information at the computer, the identification information including the call probe may displayed on the display screen. As yet another alternative, the identification information including the call probe may be provided in the manner described to the computer, but the identification information or the call probe may not be displayed. Rather, the identification information or the call probe may be incorporated into a program or otherwise used in some diagnostic or other tool implemented with the computer.

As noted above, alternatively, the response from APP SCP 31 may instruct the SSP B 22b to take actions other than terminating the communication to the called number based on the information or instructions obtained from the SPA with respect to the call probe. Thus, pursuant to this alternative, instead of the processing of the communication from SSP B 22b to telephone 24d as indicated by arrow 98, the communication may be processed in other ways. For example, the communication may be routed from SSP B 22b through the telecommunications system, and in particular, through SSP A 22a to the caller 24a. Advantageously, the receipt of the communication by the caller 24 may allow the caller to quickly view the results of the invocation of the check of the SPA.

Conclusion

In summary, the exemplary embodiments that have been described illustrate that the present invention may be used by a caller to invoke a check of a telecommunications service application. A check may be useful to determine whether the application is functioning properly. The check also may be useful to view or to make corrections to data in the application, if necessary. To invoke this check, as described above in connection with the exemplary embodiments, the caller preferably places a call to a probe access line that directs the call to an intelligent peripheral. The intelligent peripheral or an interface or data unit associated with the intelligent peripheral then engages in an exchange with the caller to obtain probe information. The intelligent peripheral may be supplement this probe information as appropriate. The intelligent peripheral places a feature access code call and transmits the arranged probe information in association with the feature access code. The feature access code call is recognized at an SSP, which then sends a query with the arranged probe information to an SCP, and in particular, to a probe creation SPA. The probe information is assembled into a call probe by the probe creation SPA and returned to the SSP in a response. Based on the called number in the call probe, the SSP transmits the call probe in association with a communication through the telecommunications system until the communication arrives at the SSP serving the called number. This terminating SSP pauses in the processing of the communication to send a query including the call probe to an application SCP (APP SCP). The APP SCP directs the call probe to the appropriate SPA. The SPA processes the call probe, and the call probe and/or other information or instructions may be returned in a response to the terminating SSP. Based on the response, the terminating SSP further processes the communication. Thus, a caller such as a service representative may invoke a check and thereby invoke the operation of a telecommunications service application so as to determine whether the application is operating properly, to determine whether the application includes correct data, and/or to change the data in the application, if appropriate.

From the foregoing description of the exemplary embodiments of the present invention and operation thereof, other embodiments will suggest themselves to those skilled in the art. Therefore, the scope of the present invention is to be limited only by the claims below and equivalents thereof.

We claim:

1. In a telecommunications system, a method to invoke a check of a service package application (SPA) with respect to a communication as the communication is routed through the telecommunications system, comprising:

A. assembling a call probe to invoke the check of the SPA with the call probe including a called number that corresponds to a service package application (SPA);

B. associating the call probe with a communication;

C. routing the communication with the call probe through the telecommunications system to the called number;

D. in the course of routing the communication, making a recognition that the called number corresponds to the SPA; and E. in response to the recognition, making a check of the SPA with respect to the communication; and F. after making the check, processing the communication pursuant to the check.

2. The method of claim 1, wherein Action F of processing the communication pursuant to the check comprises terminating the communication to the called number.

3. The method of claim 1, wherein Action F of processing the communication pursuant to the check comprises terminating the communication pursuant to the check comprises terminating the communication to a directory number other than the called number.

4. The method of claim 1, wherein the check comprises a determination that an advanced service be applied to the communication; and wherein Action F comprises, after making the check, based on the determination, applying the advanced service to the communication.

5. The method of claim 1, wherein the call probe includes an indicator corresponding to information; and wherein the check comprises a determination based on the indicator that the information be delivered in association with the processing of the communication; and wherein Action F comprises, after making the check, but prior to processing the communication,
  a. obtaining the information corresponding to the indicator,
  b. associating the information with the communication, and
  c. then processing the communication with the information pursuant to the check.

6. The method of claim 1, wherein the call probe includes an indicator corresponding to instructions; and wherein Action E comprises making the check of the SPA with respect to the communication by causing the SPA to carry out the instructions.

7. In a telecommunications system, a method to invoke a check of a service package application (SPA) with respect to a communication as the communication is routed through the telecommunications system, comprising:

A. receiving probe information at an intelligent peripheral device, the intelligent peripheral device being connected to the telecommunication system;

B. arranging the probe information into arranged probe information at an intelligent peripheral device;

C. causing the arranged probe information to be transmitted to a call probe assembler;

D. causing the call probe assembler to assemble a call probe to invoke the check of the SPA with the call probe based on the assembled probe information, and the call probe including a called number that corresponds the call probe including a called number that corresponds to a service package application (SPA);

E. associating the call probe with a communication;

F. routing the communication with the call probe through the telecommunications system to the called number;

G. in the course of routing the communication, making a recognition that the called number corresponds to the SPA; and H. in response to the recognition, making a check of the SPA with respect to the communication; and I. after making the check, processing the communication pursuant to the check.

8. The method of claim 7, wherein the check comprises a determination that an advanced service be applied to the communication; and wherein Action I comprises, after making the check, based on the determination, applying the advanced service to the communication.

9. The method of claim 7, wherein the call probe comprises an indicator corresponding to information; and wherein the check comprises a determination based on the indicator that the information be delivered in association with the processing of the communication; and wherein Action I comprises, after making the check, but prior to processing the communication,
  a. obtaining the information corresponding to the indicator,
  b. associating the information with the communication, and
  c. then processing the communication with the information pursuant to the check.

10. The method of claim 7, wherein the call probe comprises an indicator corresponding to instructions;

wherein Action H comprises making the check of the SPA with respect to the communication by causing the SPA to carry out the instructions.

11. In a telecommunications system, a system to invoke a check of a service package application (SPA) with respect to a communication as the communication is routed through the telecommunications system, the system comprising:

A. a call probe assembler for assembling a call probe to invoke the check of the SPA, the call probe including a called number that corresponds to a service package application (SPA) and for providing the call probe to a first network element of the telecommunications system;

B. the first network element being operative to receive the call probe from the call probe assembler, to associate the call probe with a communication, and to route the communication with the call probe through the telecommunications system to the called number to a second network element of the telecommunications system; and C. the second network element being operative to make a recognition that the called number corresponds to the SPA, and in response to the recognition, to make a check of the SPA with respect to the communication, and after making the check, to process the communication pursuant to the check.

12. The system of claim 11, wherein the second network element is further operative to process the communication pursuant to the check by terminating the communication to the called number.

13. The system of claim 11, wherein the second network element is further operative to process the communication pursuant to the check by terminating the communication to a directory number other than the called number.

14. The system of claim 11, wherein the call probe includes an indicator corresponding to information; and wherein the check comprises a determination based on the indicator that the information be delivered in association with the processing of the communication;

wherein the SPA is operative during the check to obtain the information corresponding to the indicator; and wherein the second network element is operative to associate the information with the communication, and then to process the communication with the information pursuant to the check.

15. The system of claim 11, wherein the call probe comprises an indicator corresponding to instructions; and wherein the SPA is operative, during the course of the check with respect to the communication, to carry out the instructions.

16. In a telecommunications system, a system to invoke a check of a service package application (SPA) with respect to a communication as the communication is routed through the telecommunications system to a destination, the system comprising:

A. an intelligent peripheral operative to receive probe information, to arrange the probe information into arranged probe information, and to cause the arranged probe information to be transmitted to a call probe assembler;

B. the call probe assembler being operative to receive the arranged probe information from the intelligent peripheral, and to assemble the call probe based on the arranged probe information, the call probe being operative to invoke a check of the SPA, and the call probe including a called number that corresponds to a service package (SPA), and the call probe assembler being further operative to provide the call probe to a first network element of the telecommunications system;

C. the first network element being operative to receive the call probe from the call probe assembler, to associate the call prove with a communication, and to route the communication with the call probe through the telecommunications system to the called number to a second network element of the telecommunications system;

D. the second network element being operative to make a recognition that the called number corresponds to the SPA, and in response to the recognition, to make a check of the SPA with respect to the communication, and after making the check, to process the communication pursuant to the check.

17. The system of claim 16, wherein the second network element is further operative to process the communication pursuant to the check by terminating the communication to the called number.

18. The system of claim 16, wherein the second network element is further operative to process the communication pursuant to the check by terminating the communication to a directory number other than the called number.

19. The system of claim 16, wherein the call probe includes an indicator corresponding to information; and wherein the check comprises a determination based on the indicator that the information be delivered in association with the processing of the communication;

wherein the SPA is operative during the check to obtain the information corresponding to the indicator; and wherein the second network element is operative to associate the information with the communication, and then to process the communication with the information pursuant to the check.

20. The system of claim 16, wherein the call probe comprises an indicator corresponding to instructions; and wherein the SPA is operative, during the course of the check with respect to the communication, to carry out the instructions.

21. An apparatus for use in the invocation of a check of a service package application (SPA) with respect to a communication as the communication is routed through the telecommunications system, comprising:

a call probe assembler operative to receive the probe information from the intelligent peripheral device and to assemble a call probe to invoke the check of the SPA, the call probe including a called number that corresponds to the SPA, and the call probe assembler also operative to provide the call probe to a network element for association of the call probe with a communications, whereby the communication with the call probe may be routed through the telecommunications system to the called number so as to invoke the check of the SPA based on the called number.

* * * * *